United States Patent [19]

Ogawa et al.

[11] Patent Number: 4,884,202
[45] Date of Patent: Nov. 28, 1989

[54] PROGRAMMABLE DRIVERLESS VEHICLE

[75] Inventors: Hiroshi Ogawa, Aichi; Susumu Yoshida, Kagamihara, both of Japan

[73] Assignee: Kabushiki Kaisha Meidensha, Tokyo, Japan

[21] Appl. No.: 9,958

[22] Filed: Feb. 2, 1987

[30] Foreign Application Priority Data

Feb. 4, 1986 [JP] Japan ................................ 61-22387
Feb. 4, 1986 [JP] Japan ................................ 61-22388

[51] Int. Cl.$^4$ ............................................. G06F 15/50
[52] U.S. Cl. ................................ 364/424.01; 180/168; 180/142; 318/587
[58] Field of Search ................................ 364/424, 425; 180/167–169, 141–143; 318/586–587

[56] References Cited

U.S. PATENT DOCUMENTS

| | | | |
|---|---|---|---|
| 4,253,541 | 3/1981 | Iida et al. ............................ | 180/168 |
| 4,665,487 | 5/1987 | Ogawa et al. ........................ | 364/424 |
| 4,665,489 | 5/1987 | Suzuki et al. ........................ | 364/424 |
| 4,716,530 | 12/1987 | Ogawa et al. ........................ | 318/587 |

Primary Examiner—Parshotam S. Lall
Attorney, Agent, or Firm—Bachman & LaPointe

[57] ABSTRACT

A programmable driverless vehicle steered in accordance with a program recorded in a data recorder. The driverless vehicle includes a control circuit for playing back the record to cause a programmed steering position representative signal to appear at the output of the data recorder. The control circuit determines the steering position error of the actual steering position from the programmed steering position indicated by the steering position signal provided from the data recorder and provides a control signal corresponding to the determined error. The control signal is applied to a control device which thereby adjusts the steering position of the driverless vehicle as required to keep the actual steering position substantially similar to the programmed steering position indicated by the programmed steering position representative signal provided from the data recorder.

9 Claims, 4 Drawing Sheets

PROGRAMMABLE DRIVERLESS VEHICLE

BACKGROUND OF THE INVENTION

This invention relates to a driverless vehicle and, more particularly, to a programmable driverless vehicle having a steering control device operable to steer the driverless vehicle in accordance with a selected program.

Driverless vehicles have been widely used in warehouses and the like. Conventionally such driverless vehicles require guide wires or tapes to define a reference path over which the driverless vehicle travels. However, such reference paths cannot be modified easily once the guide wires or tapes are installed.

SUMMARY OF THE INVENTION

Therefore, a main object of the invention is to provide a programmable driverless vehicle which does not require for floor-embedded guide wires or tapes required to provide a reference path.

It is another object of the invention to provide a programmable driverless vehicle operable in accordance with a selected program.

It it still another object of the invention to provide a programmable driverless vehicle with good steering control.

There is provided, in accordance with the invention, a programmable driverless vehicle comprising a first signal source for producing an electrical signal representative of the actual steering position of the driverless vehicle, a second signal source for producing an electrical signal representative of the distance from its initial position, covered by the driverless vehicle and a data recorder having a record of signals representative of the distance covered by the driverless vehicle and the corresponding steering position of the driverless vehicle programmed thereon. A control circuit is provided for playing back the recorded information to cause the programmed steering position representative signal corresponding to the covered distance indicated by the covered distance representative signal provided from the second signal source to appear at the output of the data recorder. The control circuit includes means for determining the steering position error of the actual steering position indicated by the steering position representative signal from the first signal source from the programmed steering position indicated by the steering position signal provided from the data recorder, and means for providing a control signal corresponding to the determined error. The control signal is applied to a control device which thereby adjusts the steering position of the driverless vehicle as required to maintain the actual steering position indicated by the steering position representative signal provided from the first signal source substantially similar to the programmed steering position indicated by the programmed steering position representative signal provided from the data recorder.

BRIEF DESCRIPTION OF THE DRAWINGS

This invention will be described in greater detail by reference to the following description taken in connection with the accompanying drawings, in which.

DETAILED DESCRIPTION OF THE INVENTION

Figure 1:
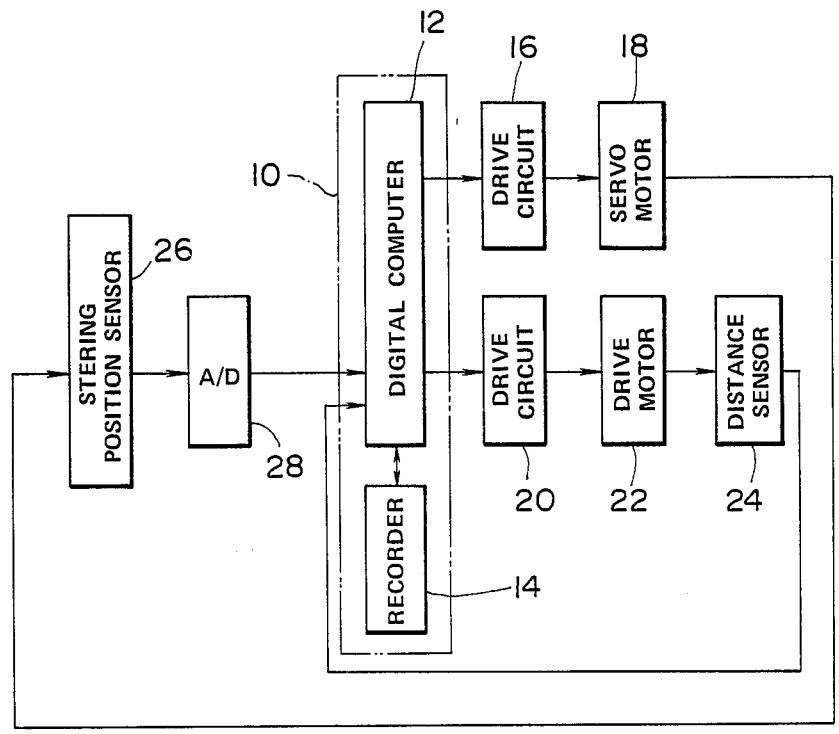
FIG. 1 is a schematic block diagram showing one embodiment of a programmable driverless vehicle steering control apparatus made in accordance with the invention.

With reference to the drawings, and in particular to FIG. 1, there is shown a schematic block diagram of a driverless vehicle steering control apparatus embodying the invention. The driverless vehicle steering control apparatus, generally designated by the numeral 10, is shown as including a digital computer 12 and a recorder 14. The recorder 14 may be a magnetic tape or similar recorder capable of recording and playing back road information representing vehicle speed and steering position values as a function of covered distance from an initial vehicle position. The road data may be derived empirically or a road record obtained during actual running of a vehicle over a predetermined road course while the speed thereof, as indicated by a tachometer, the steering position, as indicated by a potentiometer, and the covered distance thereof, as indicated by a magnetic pickup transducer, are simultaneously recorded to provide a record of the speed and the steering position resulting from the teaching mode.

The digital computer 12 shall be regarded as including a central processing unit (CPU), a read only memory (ROM), a read/write memory (RAM), a digital-to-analog converter, and a timer. The ROM contains the program for operating the central processing unit and further contains appropriate data in look-up tables used in calculating appropriate values for vehicle speed and steering position. The look-up data may be obtained experimentally or derived empirically. Control words specifying a desired vehicle steering position are periodically transferred by the central processing unit to the digital-to-analog converter. The digital-to-analog converter converts the transferred information into analog form and applies a steering control signal to a steering motor drive circuit 16. The steering motor drive circuit 16 may be taken in the form of a chopper circuit operable to produce a drive signal having a duty ratio corresponding to the control signal to drive the steering control servo motor 18. The steering control servo motor 18 has an output shaft drivingly connected to a vehicle steering shaft for the vehicle steering control. Control words specifying a desired vehicle speed are also periodically transferred by the central processing unit to the digital-to-analog converter. The digital-to-analog converter converts the transferred information into analog form and applies a speed control signal to a speed control circuit 20 for controlling a vehicle drive motor 22. The speed control circuit 20 forms no part of this invention and will not be described further.

A covered distance sensor 24 produces a digital signal corresponding to the distance traveled by the vehicle. The covered distance sensor 24 may include an electrical pickup coil which generates an alternating voltage across its terminals as a result of changes in magnetic flux in its magnetic circuit. These flux changes are produced by a notched member connected to the output shaft of the vehicle drive motor 22 for rotation therewith. The alternating signal pulses derived from the pickup coil are amplified and shaped. The resulting pulses are counted by a counter which accumulates a count proportional to the distance of travel of the vehicle from its initial starting position. The distance signal is applied from the covered distance sensor 24 to the digital computer 12.

A steering position sensor 26 produces an electrical signal indicative of the position of the vehicle steering shaft with respect to a reference position. The vehicle steering position sensor may include a potentiometer having a wiper arm operatively connected to the servo motor output shaft to change the resistance value of the potentiometer as the steering control motor 18 rotates. The steering position signal is applied from the steering position sensor 26 to an analog-to-digital converter 28 which converts it into a corresponding digital signal for application to the digital computer 12.

The driverless vehicle is placed at a selected initial position. The drive motor 22 is started and the road record is played back by the data recorder 14. The programmed steering position signal is applied from the data recorder 14 to the digital computer 12. The digital computer 12 functions in comparing the actual steering position with the programmed position, calculating a steering position error and correspondingly generating a command signal for correcting the steering position error. In practice, the digital compute calculates a duty ratio or an on-time from a relationship programmed into the digital computer. The relationship defines the duty ratio or on-time as a function of the calculated steering position error. The digital computer causes the steering motor drive circuit 16 to produce a drive signal having a duty ratio or on-time corresponding to the calculated duty ratio or on-time. The drive signal is applied to drive the steering control servo motor 18 for a time corresponding to the calculated duty ratio or on-time required to bring the vehicle steering position to a position substantially similar to the programmed steering position.

Figure 2:
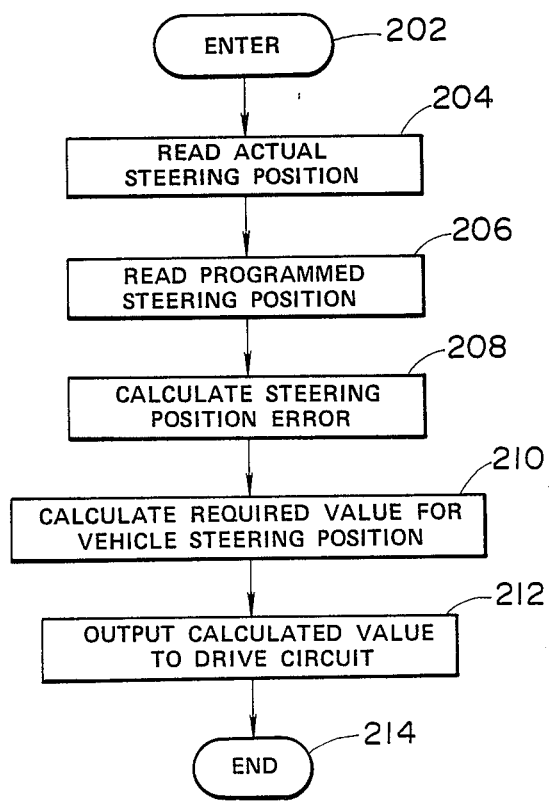
FIG. 2 is a flow diagram showing the programming of the digital computer used in the apparatus of FIG. 1.

FIG. 2 is a flow diagram showing a modified form of the programming of the digital computer. The computer program is entered at the point 202 at predetermined time intervals or at appropriate times, or in synchronism with vehicle drive motor rotation. At the point 204 in the program, the actual steering position signal fed from the steering position sensor 26 is converted by the analog-to-digital converter 28 into digital form and read into the computer memory. At the point 206 in the program, the programmed steering position signal from the recorder 14 is read into the computer memory.

At the point 208 in the program, the digital computer center processing unit calculates an error of the actual steering position from the programmed steering position. At the point 210 in the program, the central processing unit calculates a required steering position value in terms of the direction and degree of motion of the steering control servo motor 18 required to correct the steering position error. The direction in which the steering control servo motor 18 is to rotate is determined as a first direction steering the vehicle to the right when the sign of the calculated error is positive and as a second direction steering the vehicle to the left when the calculated error is negative. The degree through which the steering control servo motor 18 is to rotate is determined as the duty ratio D of the drive signal fed from the steering motor drive circuit 16 to drive the steering control servo motor 18. The drive signal duty ratio D is calculated from a relationship programmed into the digital computer. This relationship defines the required value as a function of calculated steering position error.

At the point 212 in the program, the calculated information is transferred to the drive circuit 16 which thereby produces a control signal having a duty ratio corresponding to the calculated value for correcting the steering position error. Upon completion of the step at the point 212, the program proceeds to the end point 214 where the present cycle is terminated.

Figure 3:
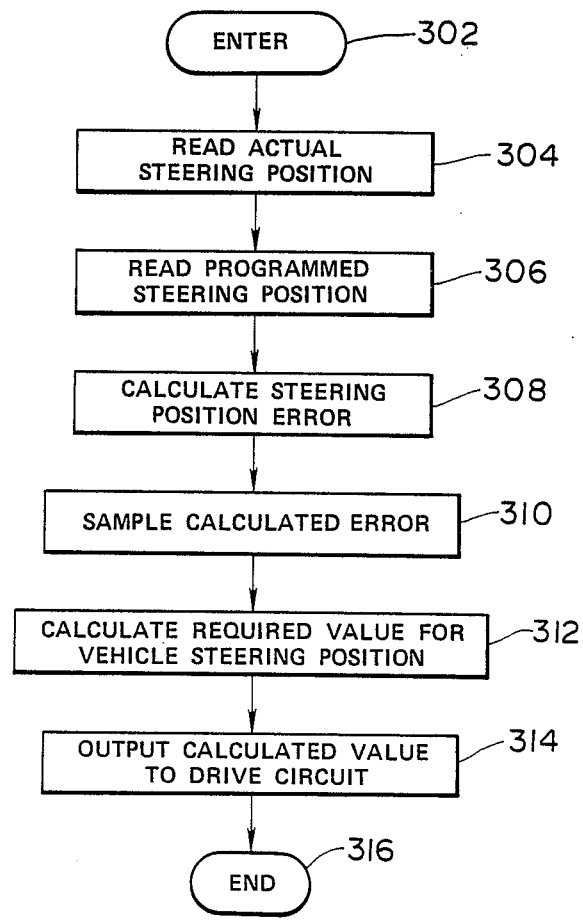
FIG. 3 is a flow diagram showing a modified form of the steering control apparatus.

FIG. 3 is a flow diagram showing a modified form of the programming of the digital computer. In this modification, the control circuit 10 is intended to compensate for a delay between the time a steering position error occurs and the time the vehicle steering position is changed to correct the steering position error. Such a delay, which may be caused by the play which exists in the mechanism coupling the steering control servo motor 18 to the vehicle steering shaft, inertia force which is produced by the steering control servo motor 18, or other factors, would result in overshooting or other improper vehicle steering.

The computer program is entered at the point 302 at predetermined time intervals or at appropriate times, or in synchronism with vehicle drive motor rotation. At the point 304 in the program, the actual steering position signal fed from the steering position sensor 26 is converted by the analog-to-digital converter 28 into digital form and read into the computer memory. At the point 306 in the program, the programmed steering position signal fed from the data recorder 14 is read into the computer memory.

At the point 308 in the program, the digital computer central processing unit calculates an error of the actual steering position from the programmed steering position. At the point 310, the calculated error is stored into the digital memory. The computer memory includes a memory such as a shift register or the like which can store a predetermined number of errors calculated successively in the present and previous cycles so that the memory will have, at any time, the most recent successive errors.

At the point 312 in the program, the central processing unit calculates a required steering position value in terms of the direction and degree of motion of the steering control servo motor 18 required to correct the steering position error. The direction in which the steering control servo motor 18 is to rotate is determined as a first direction for steering the vehicle to the right when the sign of the calculated error is positive and as a second direction for steering the vehicle to the left when the calculated error is negative. The degree through which the steering control servo motor 18 is to rotate is determined as the duty ratio D of the drive signal fed from the steering motor drive circuit 16 to drive the steering control servo motor 18. The drive signal duty ratio D is calculated from a relationship programmed into the digital computer. This relationship defines the required value as a function of calculated steering position error. The calculated value is modified in accordance with old errors, which have been stored into the computer memory in the previous cycles in order to correct the steering position error in a shorter time while avoiding overshoot.

At the point 314 in the program, the calculated information is transferred to the drive circuit 16 which thereby produces a control signal having a duty ratio corresponding to the calculated value for correcting the steering position error. Upon completion of the step at where the cycle is terminated.

Figure 4:
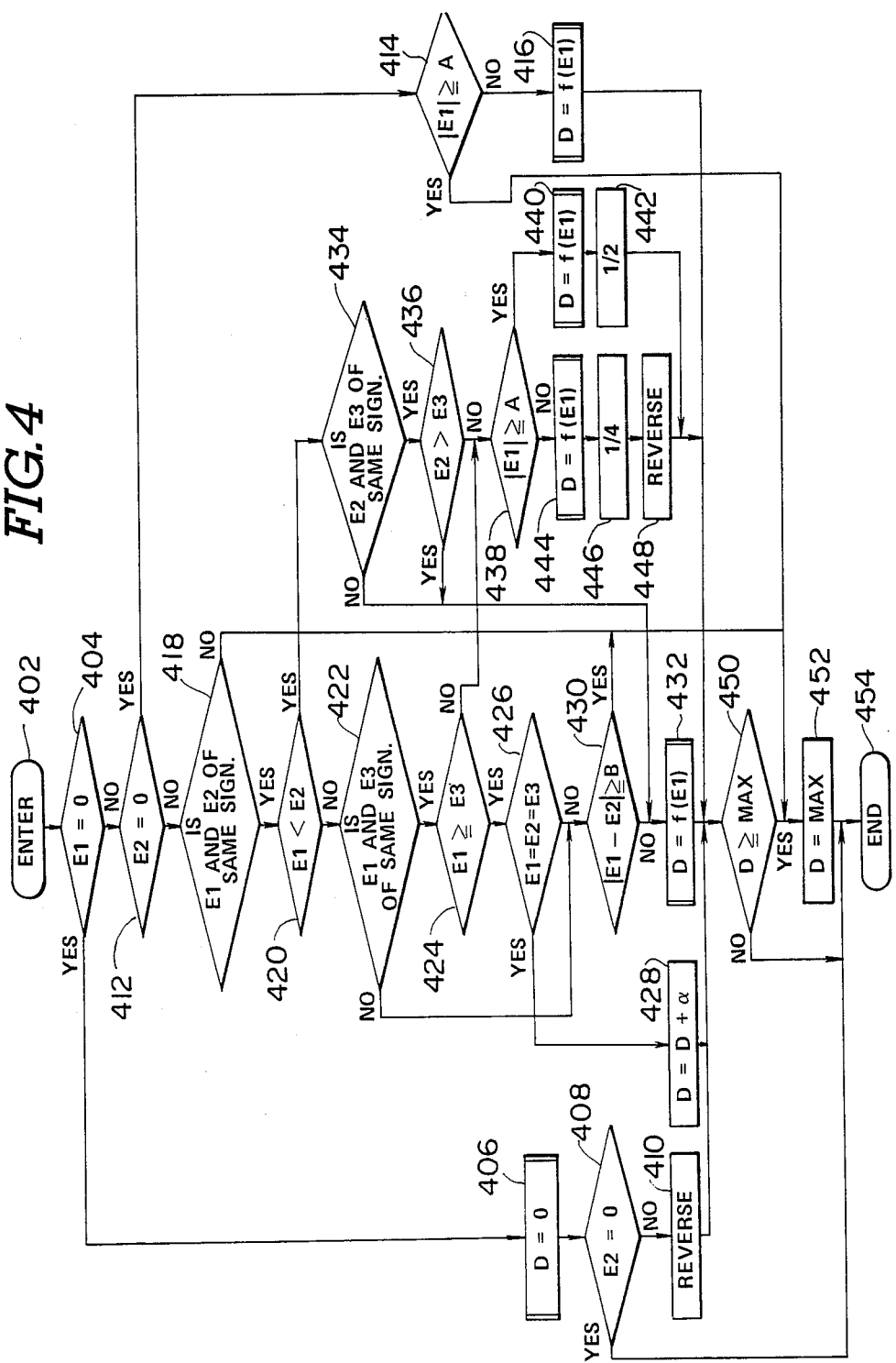
FIG. 4 is a detailed flow diagram for the digital computer as programmed for the calculation of the duty ratio.

FIG. 4 is a detailed flow diagram illustrating the above calculation of vehicle steering position in terms of the duty ratio of the control signal fed to drive the steering servo control motor 18. It is now assumed that the computer memory has the three most recent successive errors E3, E2 and E1 stored in this order. At the point 402 of FIG. 4, which corresponds to the point 310 of FIG. 3, the computer program entered. At the point 404 in the program, a determination is made as to whether or not the error E1, which was sampled at the point 310 of FIG. 3 in the present cycle, is zero. If the answer to this question is "yes", then the program proceeds to the point 406 where the digital computer central processing unit set the duty ratio D at zero. Following this, the program proceeds to a determination step at the point 408. This determination is as to whether or not the error E2, which was sampled at the point 310 of FIG. 3 one cycle before, is zero. If the answer to this question is "yes", then it means that the driverless vehicle is being steered correctly in accordance with the recorded program and the program proceeds to the end point 454 which corresponds to the point 314 of FIG. 3. If the answer to the question inputted at the point 408 is "no", then it means that the error had decreased to zero until the error E1 was sampled and the program proceeds to the point 410 where a command is generated to reverse the direction of motion of the steering servo control motor 12. This is effective to avoid overshoot which may occur if the vehicle steering direction remains as it was. Following this, the program proceeds to the point 450 where a determination is made as to whether or not the calculated duty ratio value D is equal to or greater than a predetermined maximum value MAX. Since the calculated duty ratio value D is zero, the program proceeds to the end point 454.

If the answer to the question inputted at the point 404 is "no", then the program proceeds to another determination step at the point 412. This determination is as to whether or not the sampled error E2 is zero. If the answer to this question is "yes", then the program proceeds to the point 414 where a determination is made as to whether or not the absolute value of the sampled error E1 is equal to or greater than a predetermined value A. If the answer to this question is "yes", then the program proceeds to the point 452 where the duty ratio D is set at the predetermined maximum value MAX in order to increase the time during which the steering control servo motor 18 is driven to change the vehicle steering position toward the programmed position. Otherwise, the program proceeds to the point 416 where the central processing unit calculates the duty ratio D from a relationship programmed into the computer. This relationship defines duty ratio D as a function of sampled error E1. Upon completion of the step at the point 416, the program proceeds to the point 450 where a determination is made as to whether or not the calculated duty ratio value D is equal to or greater than the predetermined maximum value MAX. If the answer to this question is "yes", then the program proceeds to the point 452 where the duty ratio D is set at the predetermined maximum value MAX and then to the end point 454. Otherwise, the program proceeds directly to the end point 454.

If the answer to the question inputted at the point 412 is "no", then the program proceeds to another determination step at the point 418. This determination is as to whether or not the errors E1 and E2 have the same sign. If the answer to this question is "no", then the program proceeds to the point 452 where the duty ratio D is set at the predetermined maximum value MAX and then to the end point 454. Otherwise, the program proceeds to another determination step at the point 420. This determination is as to whether or not the error E1 is smaller than the error E2. If the answer to this question is "no", then the program proceeds to another determination step at the point 422. This determination is as to whether or not the errors E1 and E3 have the same sign. If the answer to this question is "yes", then the program proceeds to another determination step at the point 424. This determination is as to whether or not the error E1 is equal to or greater than the error E3. If the answer to this question is "yes", then the program proceeds to the point 426 where a determination is made as to whether or not E1=E2=E3. If the answer to this question is "yes", then it means that the vehicle steering tends to deviate the same angle three times from the programmed position in the same direction and the program proceeds to the point 428 where the central processing unit calculates the duty ratio D by adding a predetermine value α to the duty ratio value D calculated in the previous cycle in order to increase the time during which the steering control servo motor 18 is driven to change the vehicle steering position toward the programmed position. Upon completion of the step at the point 428, the program proceeds to the point 450.

If the answer to the question inputted at the point 422 or 426 is "no", then the program proceeds to the point 430 where a determination is made as to whether or not the absolute value of the difference between the errors E1 and E2 is equal to or greater than a predetermined value B. If the answer to this question is "yes", then the program proceeds to the point 452. Otherwise, the program proceeds to the point 432 where the duty ratio D is calculated from the relationship programmed into the digital computer. This relationship defined duty ratio D as a function of error E1. Following this, the program proceeds to the point 336 where a determination is made as to whether or not the calculated duty ratio value D is equal to or greater than the predetermined maximum value MAX. If the answer to this question is "yes", then the program proceeds to the point 452 where the duty ratio D is set at the maximum value MAX and then to the end point 454. Otherwise, the program proceeds directly to the end point 454.

If the answer to the question inputted at the point 420 is "yes", then the program proceeds to another determination step at the point 434. This determination is as to whether or not the error E2 and E3 have the same sign. If the answer to this question is "no", then the program proceeds to the point 432. Otherwise, the program proceeds to the point 436.

At the point 436 in the program, a determination is made as to whether or not the error E2 is greater than the error E3. If the answer to this question is "yes", then the program proceeds to the point 432. If the error E2 is equal to or less than the error E3, it means that the steering position is comming closer to the programmed position and the program proceeds to another determination step at the point 438. This determination is as to whether or not the absolute value of the error E1 is equal to or greater than the predetermined value A. If the answer to this question is "yes", then the program proceeds to the point 440 where the duty ratio D is calculated from the relationship programmed into the digital computer. This relationship defines duty ratio D as a function of error E1 in the same manner as described in connection with the point 416. Following this, the program proceeds to the point 442 where the central processing unit modifies the calculated duty ratio value in a direction decreasing the time during which the steering control servo motor 18 is driven to change the vehicle steering position toward the programmed position by multiplying ½ to it. Upon completion of the step at the point 442, the program proceeds to the point 450. If the answer to the question inputted at the point 438 is "no", then the program proceeds to the point 444 where the duty ratio D is calculated in the same manner as described in connection with the point 416. Following this, the program proceeds to the point 446 where the central processing unit modifies the calculated duty ratio value to decrease the time during which the steering control servo motor 18 is driven to change the vehicle steering position toward the programmed position by multiplying it by ¼. Upon completion of the step at the point 446, the program proceeds to the point 448 where a command is generated to reverse the direction of rotation of the steering control servo motor 18. This is effective to avoid overshoot which may occur if the vehicle steering direction remains as it was. Following this, the program proceeds to the point 450.

At the point 450 in the program, a determination is made as to whether or not the calculated duty ratio value is equal to or greater than the predetermined maximum value MAX. If the answer to this question is "yes", then the program proceeds to the point 452 where the central processing unit modifies the calculated duty ratio value by setting it at the maximum value MAX. If the answer to the question inputted into the point 450 is "no", then the program jumps the point 454 to the end point 454.

While the present invention has been described in conjunction with a specified embodiment thereof, it is evident that may alternatives, modifications and variations will be apparent to those skilled in the art. Accordingly, it is intended to embrace all alternatives, modifications and variations that fall within the scope of the appended claims.

What is claimed is:

1. A programmable driverless vehicle comprising:
   a first signal source for producing a first electrical signal having an actual value for a steering position of the driverless vehicle;
   a second signal source for producing a second electrical signal having a value for a distance from its initial position covered by the driverless vehicle;
   a data recorder having a record of information programmed therein, the information defining target steering positions as a function of the covered distance;
   a control circuit responsive to the second signal for calculating a target value for the steering position from the information programmed in the data recorder, the control circuit including means for calculating an error between the actual and target values for the steering position, the control circuit including means for storing a predetermined number of steering position errors calculated successively to have the most recent successive steering position errors, the control circuit including means for calculating a duty ratio as a function of the new steering position error, the control circuit including means for setting the duty ratio at a predetermined maximum value when the new and last steering position errors have the same sign and when the last steering position error is zero and the new steering position error has an absolute value equal to or greater than a predetermined value, the control circuit including means for producing a control signal having a value corresponding to the calculated duty ratio;
   means including a servo motor responsive to the control signal fed thereto from the control circuit for changing the steering position of the driverless vehicle for a time corresponding to the duty ratio.

2. The programmable driverless vehicle as claimed in claim 1, wherein the control circuit includes means for reversing the direction of steering of the driverless vehicle when the last steering position error is not zero and when the new steering position error is less than a predetermined value.

3. The programmable driverless vehicle as claimed in claim 1, wherein the control circuit includes means for decreasing the calculated duty ratio when the steering position is coming closer to the target position.

4. A programmable driverless vehicle comprising:
   a first signal source for producing a first electrical signal having an actual value for a steering position of the driverless vehicle;
   a second signal source for producing a second electrical signal having a value for a distance from its initial position covered by the driverless vehicle;
   a data recorder having a record of information programmed therein, the information defining target steering positions as a function of the covered distance;
   a control circuit responsive to the second signal for calculating a target value for the steering position from the information programmed in the data recorder, the control circuit including means for calculating an error between the actual and target values for the steering position, the control circuit including means for storing a predetermined number of steering position errors calculated successively to have the most recent successive steering position errors, the control circuit including means for calculating a duty ratio as a function of the new steering position error, the control circuit including means for setting the duty ratio at a predetermined maximum value when the new and last steering position errors have the same sign, the control circuit including means for adding a predetermined value to a duty ratio calculated for the last steering position error when the three most recent successive steering position errors have the same magnitude and the same sign, the control circuit including means for producing a control signal having a value corresponding to the calculated duty ratio;
   means including a servo motor responsive to the control signal fed thereto from the control circuit for changing the steering position of the driverless vehicle for a time corresponding to the duty ratio.

5. A programmable driverless vehicle comprising:
   a first signal source for producing a first electrical signal having an actual value for a steering position of the driverless vehicle;
   a second signal source for producing a second electrical signal having a value for a distance from its initial position covered by the driverless vehicle;

a data recorder having a record of information programmed therein, the information defining target steering positions as a function of the covered distance;

a control circuit responsive to the second signal for calculating a target value for the steering position from the information programmed in the data recorder, the control circuit including means for calculating an error between the actual and target values for the steering position, the control circuit including means for storing a predetermined number of steering position errors calculated successively to have the most recent successive steering position errors, the control circuit including means for calculating a duty ratio as a function of the new steering position error, the control circuit including means for setting the duty ratio at a predetermined maximum value when the last steering position error is zero and the new steering position error has an absolute value equal to or greater than a predetermined value, the control circuit including means for producing a control signal having a value corresponding to the calculated duty ratio;

means including a servo motor responsive to the control signal fed thereto from the control circuit for changing the steering position of the driverless vehicle for a time corresponding to the duty ratio.

6. The programmable driverless vehicle as claimed in claim 5, wherein the control circuit includes means for setting the duty ratio at the predetermined maximum value when the new and last steering position errors have the same sign.

7. The programmable driverless vehicle as claimed in claim 5, wherein the control circuit includes means for reversing the direction of steering of the driverless vehicle when the last steering position error is not zero and when the new steering position error is less than a predetermined value.

8. The programmable driverless vehicle as claimed in claim 5, wherein the control circuit includes means for decreasing the calculated duty ratio when the steering position is coming closer to the target position.

9. The programmable driverless vehicle as claimed in claim 5, wherein the control circuit includes means for adding a predetermined value to a duty ratio calculated for the last steering position error when the three most recent successive steering position errors have the same magnitude and the same sign.

* * * * *